US012665305B2

(12) United States Patent
Wu et al.

(10) Patent No.: US 12,665,305 B2
(45) Date of Patent: Jun. 23, 2026

(54) ELECTRONIC DEVICE

(71) Applicant: PEGATRON CORPORATION, Taipei City (TW)

(72) Inventors: Chien-Yi Wu, Taipei City (TW); Shao-Chi Wang, Taipei City (TW); Hau Yuen Tan, Taipei City (TW); Chao-Hsu Wu, Taipei City (TW); Chih-Wei Liao, Taipei City (TW); Chih-Hung Cho, Taipei City (TW); Shih-Keng Huang, Taipei City (TW); Hung-Te Liao, Taipei City (TW); Ming-Huang Chen, Taipei City (TW); Chang-Hsun Wu, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 84 days.

(21) Appl. No.: 18/953,011

(22) Filed: Nov. 19, 2024

(65) Prior Publication Data

US 2025/0246816 A1 Jul. 31, 2025

(30) Foreign Application Priority Data

Jan. 31, 2024 (TW) ................................ 113103836

(51) Int. Cl.

*H01Q 5/30* (2015.01)
*H01Q 5/335* (2015.01)
*H01Q 9/04* (2006.01)

(52) U.S. Cl.

CPC ........... *H01Q 9/0414* (2013.01); *H01Q 5/335* (2015.01)

(58) Field of Classification Search

CPC .......... H01Q 1/241; H01Q 1/243; H01Q 5/30; H01Q 5/371; H01Q 5/335; H01Q 5/378;
(Continued)

(56) References Cited

U.S. PATENT DOCUMENTS

| | | | | |
|---|---|---|---|---|
| 2011/0187607 A1* | 8/2011 | Lu | H01Q 9/26 343/702 |
| 2015/0002340 A1* | 1/2015 | Liou | H01Q 9/42 343/700 MS |

(Continued)

FOREIGN PATENT DOCUMENTS

| | | |
|---|---|---|
| CN | 112821039 | 5/2023 |
| TW | I785828 | 12/2022 |
| TW | I792570 | 2/2023 |

*Primary Examiner* — Thai Pham
(74) *Attorney, Agent, or Firm* — J.C. PATENTS

(57) ABSTRACT

An electronic device includes a metal back cover, a metal frame, and at least one antenna module. The antenna module includes a separated portion, a first radiator, a second radiator, a third radiator disposed between the first radiator and the second radiator, and a fourth radiator connected to the separated portion. A first section of the first radiator is connected to the separated portion. A second section of the first radiator extends from the first section and has a first ground terminal. A third section of the first radiator extends from the first section and has a second ground terminal. The second radiator extends from the separated portion and has a third ground terminal. The third radiator includes a fourth section and a fifth section extending from the fourth section towards the second radiator. The fourth section is located next to the third section and has a fourth ground terminal.

17 Claims, 9 Drawing Sheets

(58) Field of Classification Search
CPC ...... H01Q 9/0414; H01Q 9/0421; H01Q 9/42; H01Q 21/28
See application file for complete search history.

(56) References Cited

U.S. PATENT DOCUMENTS

| | | | | |
|---|---|---|---|---|
| 2021/0151858 | A1* | 5/2021 | Wu | H01Q 9/0457 |
| 2023/0093423 | A1* | 3/2023 | Wu | H01Q 1/24<br>343/715 |
| 2024/0072411 | A1* | 2/2024 | Wu | H01Q 1/243 |
| 2024/0079758 | A1* | 3/2024 | Wu | H01Q 1/36 |

* cited by examiner

ELECTRONIC DEVICE

CROSS-REFERENCE TO RELATED APPLICATION

This application claims the priority benefit of Taiwan application serial no. 113103836, filed on Jan. 31, 2024. The entirety of the above-mentioned patent application is hereby incorporated by reference herein and made a part of this specification.

BACKGROUND

Technical Field

The invention relates to an electronic device, and particularly relates to an electronic device with antenna.

Description of Related Art

As requirements on product texture and aesthetics gradually increase, how to make an electronic device to still provide good antenna functions while a casing thereof is mainly made of a metal material is a research direction in this field.

SUMMARY

The invention is directed to an electronic device, which has a casing mainly made of a metal material and has a special antenna design, so as to provide a good antenna function.

The invention provides an electronic device including a metal back cover, a metal frame, and at least one antenna module. The metal frame includes at least two connecting portions, wherein the at least two connecting portions are connected to the metal back cover. Each of the antenna modules includes a separated portion, a first radiator, a second radiator, a third radiator, and a fourth radiator. The separated portion of the antenna module is spaced between the at least two connecting portions, the separated portion is separated from the metal back cover and includes a feed terminal, a first terminal, and a second terminal. The first terminal and the second terminal are away from each other, the feed terminal is located between the first terminal and the second terminal. The first radiator includes a first section, a second section, and a third section, wherein the first section includes a third terminal and a fourth terminal opposite to each other, the third terminal is connected to the separated portion near the first terminal, and the second section extends from a portion of the first section located between the third terminal and the fourth terminal, and has a first ground terminal, the third section extends from the fourth terminal and has a second ground terminal. The second radiator extends from a portion of the separated portion located between the feed terminal and the second terminal and has a third ground terminal. The third radiator is disposed between the first radiator and the second radiator, and includes a fourth section and a fifth section connected to each other. The fourth section is located next to the third section and has a fourth ground terminal. The fifth section extends from one end of the fourth section opposite to the fourth ground terminal toward a direction of the second radiator. The fourth radiator is located between the first section and the separated portion and between the fifth section and the separated portion, and the fourth radiator is connected to the separated portion.

In an embodiment of the invention, the antenna module further includes a first slot, and the first slot is formed between the third section and the fourth section.

In an embodiment of the invention, the antenna module further includes a second slot, and the second slot is formed between the first section and the fourth radiator and between the fifth section and the fourth radiator.

In an embodiment of the invention, the separated portion, the first radiator, and the second radiator jointly excite a low frequency band, a medium-high frequency band, and an ultra-high frequency band.

In an embodiment of the invention, the low frequency band is between 600 MHz and 960 MHz, the medium-high frequency band is between 1700 MHz and 2000 MHz, and the ultra-high frequency band is between 4900 MHz and 6000 MHz.

In an embodiment of the invention, a length of the separated portion is 0.25 times a wavelength of the low frequency band.

In an embodiment of the invention, the electronic device further includes a conductor retaining wall, the first radiator, the second radiator, the third radiator, and the fourth radiator are located between the conductor retaining wall and the separated portion, and a distance between the separated portion and the conductor retaining wall is 0.05 times a wavelength of the low frequency band.

In an embodiment of the invention, the first radiator, the third radiator, and the fourth radiator jointly excite a high frequency band.

In an embodiment of the invention, the high frequency band is between 2000 MHz and 4900 MHz.

In an embodiment of the invention, each of the antenna modules includes an impedance matching circuit electrically connected to the feed terminal.

In an embodiment of the invention, each of the antenna modules includes a switching circuit connected to the third ground terminal of the second radiator.

In an embodiment of the invention, the switching circuit switches between an open circuit and a passive component, and the passive component is provided at the third ground terminal of the second radiator.

In an embodiment of the invention, a number of the at least one antenna module is plural, and the antenna modules are respectively arranged at a plurality of corners of the electronic device.

In an embodiment of the invention, a diagonal length of the electronic device is less than 9 inches and the electronic device further includes two short sides, and the first radiator of each of the antenna modules is located next to one of the two short sides of the electronic device, and extends along the short side of the electronic device.

In an embodiment of the invention, a diagonal length of the electronic device is greater than or equal to 9 inches, and the electronic device further includes two long sides and two short sides. The first radiator of one of the antenna modules is located next to one of the two short sides of the electronic device and extends along the short side of the electronic device, and the first radiator of another one of the antenna modules is located next to one of the two long sides of the electronic device, and extends along the long side of the electronic device.

In an embodiment of the invention, the electronic device further includes a plastic bracket and an antenna circuit board. The plastic bracket includes a first surface, a second surface, a third surface, and a fourth surface. The first surface and the third surface are perpendicular to the second surface and the fourth surface. The fourth surface and the third surface are respectively connected to the separated portion and the antenna circuit board, the first radiator and the third radiator are provided on the second surface, the fourth radiator is provided on the first surface, and the second radiator extends from the first surface to the second surface.

In an embodiment of the invention, the separated portion is L-shaped and is located at a corner of the electronic device.

Based on the above description, the separated portion of the electronic device of the invention serves as a part of the antenna module, the first section of the first radiator is connected to the separated portion, the second section of the first radiator extends from the first section to the first ground terminal, and the third section of the first radiator extends from the first section to the second ground terminal. The second radiator extends from the separated portion to the third ground terminal. The fourth section of the third radiator is located next to the third section and extends to the fourth ground terminal, and the fifth section of the third radiator extends from the fourth section to the second radiator. The fourth radiator is connected to the separated portion. Through the above-mentioned special antenna design, the electronic device of the invention is adapted to provide a good antenna function when the casing is mainly made of a metal material.

DESCRIPTION OF THE EMBODIMENTS

Figure 1:
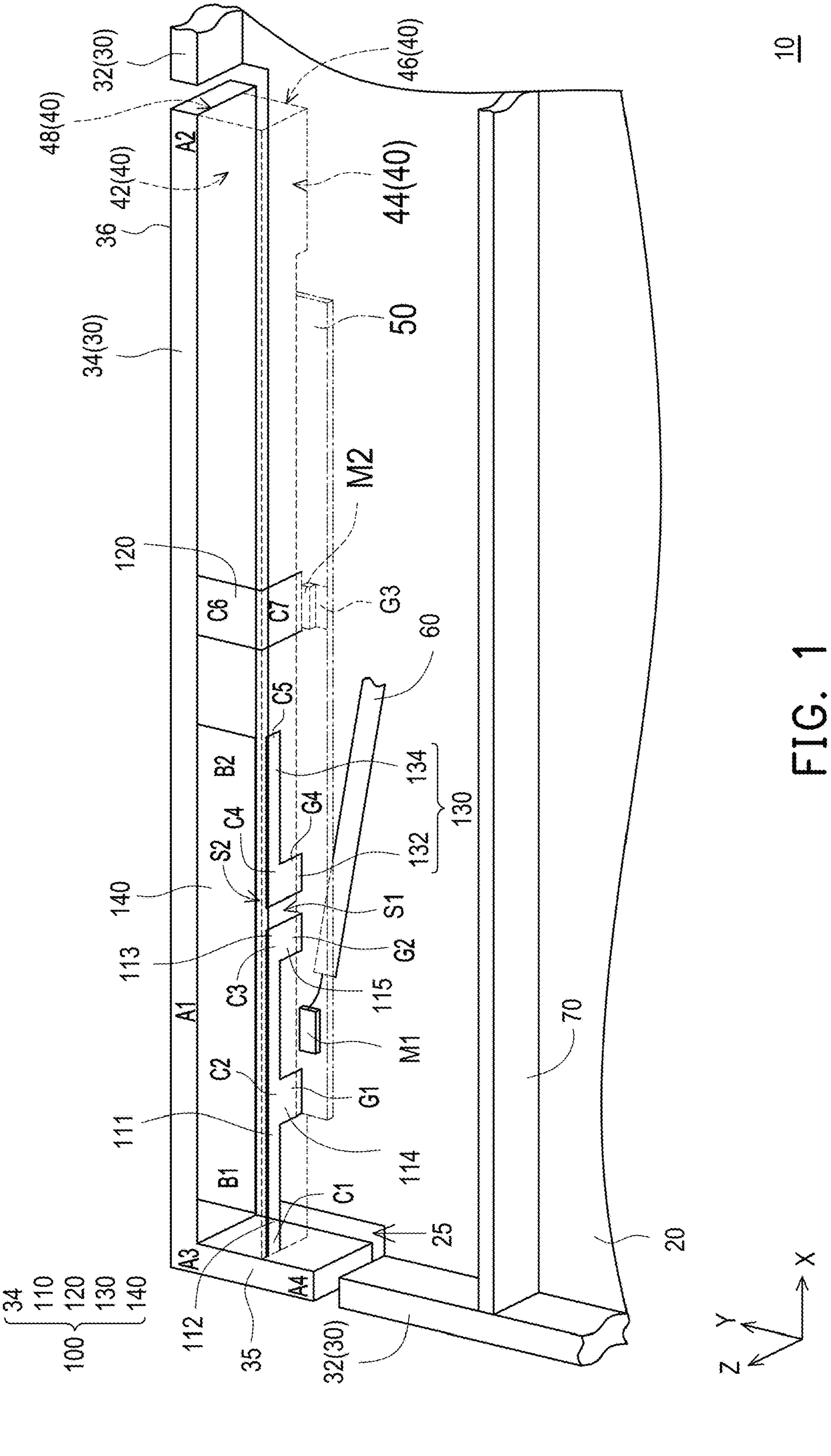
FIG. 1 is a partial three-dimensional view of an electronic device according to an embodiment of the invention.
Figure 2A:
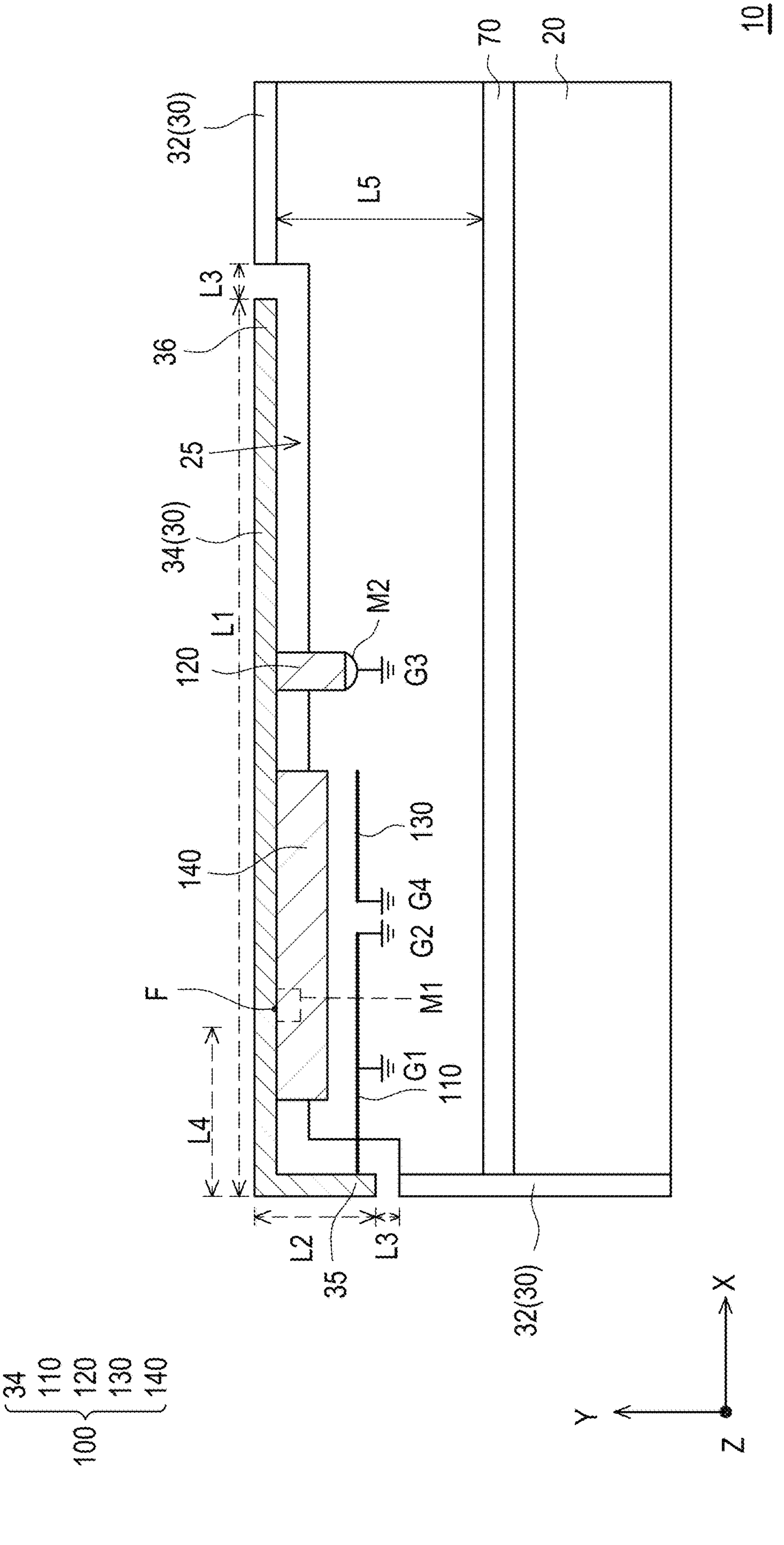
FIG. 2A is a schematic top view of FIG. 1 with a plastic bracket and an antenna circuit board hidden.
Figure 2B:
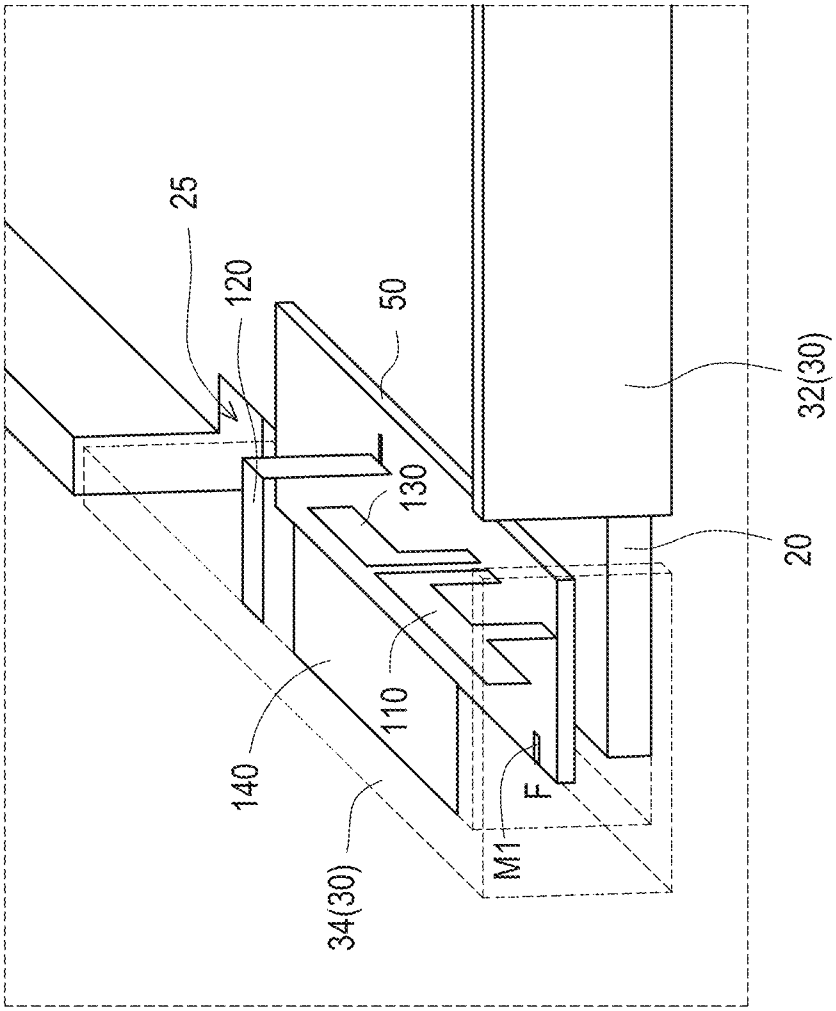
FIG. 2B is a schematic three-dimensional perspective view of FIG. 1 with the plastic bracket hidden.
Figure 2C:
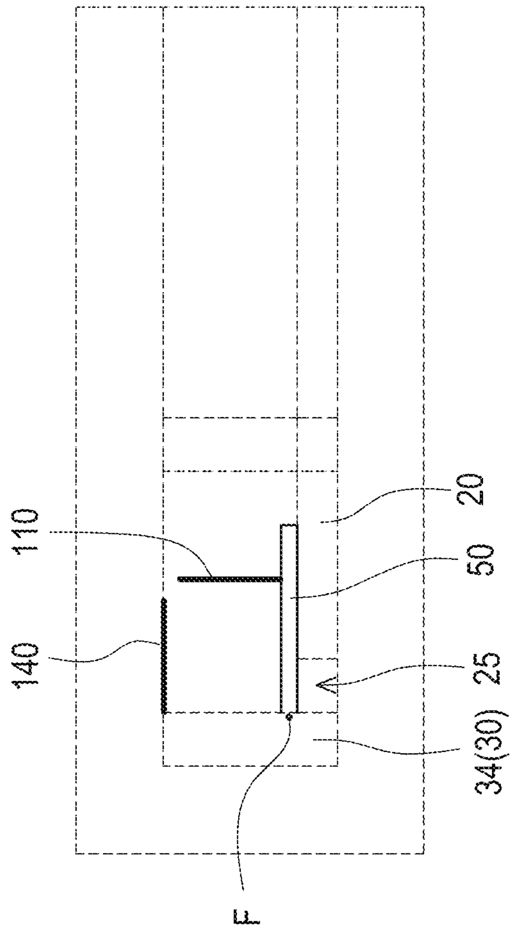
FIG. 2C is a schematic side perspective view of FIG. 2B.

FIG. 1 is a partial three-dimensional view of an electronic device according to an embodiment of the invention. FIG. 2A is a schematic top view of FIG. 1 with a plastic bracket and an antenna circuit board hidden. FIG. 2B is a schematic three-dimensional perspective view of FIG. 1 with the plastic bracket hidden. FIG. 2C is a schematic side perspective view of FIG. 2B. It should be noted that FIG. 1 to FIG. 2C only show one corner of the electronic device. FIG. 2A hides the plastic bracket and the antenna circuit board, and marks an antenna module with a diagonal line. FIG. 2B and FIG. 2C hide the plastic bracket in FIG. 1.

Referring to FIG. 1 to FIG. 2C, an electronic device 10 of the embodiment is, for example, a tablet computer or a mobile phone, but the type of the electronic device 10 is not limited thereto. The electronic device 10 of the embodiment includes a metal back cover 20, a metal frame 30, and at least one antenna module 100. The metal frame 30 includes at least two connecting portions 32, and the at least two connecting portions 32 are connected to the metal back cover 20. In FIGS. 1 and 2A, one antenna module 100 and two connecting portions 32 are shown as an example. In fact, the numbers of the antenna modules 100 and the connecting portions 32 of the electronic device 10 are not limited thereto.

In the embodiment, the antenna module 100 includes a separated portion 34, a first radiator 110, a second radiator 120, a third radiator 130, and a fourth radiator 140. The separated portion 34 is spaced between the at least two connecting portions 32. The separated portion 34 is separated from the metal back cover 20 and the two connecting portions 32 through a U-shaped trench hole 25. In the embodiment, the separated portion 34 and the connecting portions 32 of the metal frame 30 together form an outer frame of the electronic device 10. The separated portion 34 is L-shaped and is located at a corner of the electronic device 10.

In the embodiment, the separated portion 34 (positions A4, A3, A1, A2) includes a feed terminal F (FIGS. 2A, 2B, 2C), a first terminal 35 (position A4), and a second terminal 36 (position A2). The first terminal 35 and the second terminal 36 are away from each other. The feed terminal F is located between the first terminal 35 and the second terminal 36. The feed terminal F is located at a lower edge of the separated portion 34 and close to the U-shaped trench hole 25.

The electronic device 10 further includes a plastic bracket 40 and an antenna circuit board 50. The plastic bracket 40 is located next to the separated portion 34. The first radiator 110, the second radiator 120, the third radiator 130, and the fourth radiator 140 are arranged on the plastic bracket 40 by, for example, laser direct structuring (LDS).

Specifically, as shown in FIG. 1, the plastic bracket 40 includes a first surface 42, a second surface 44, a third surface 46, and a fourth surface 48 connected sequentially. The first surface 42 and the third surface 46 are perpendicular to the second surface 46 and the fourth surface 48. The fourth surface 48 and the third surface 46 are respectively connected to the separated portion 34 and the antenna circuit board 50. The first radiator 110 and the third radiator 130 are disposed on the second surface 44, the fourth radiator 140 is disposed on the first surface 42, and the second radiator 120 extends from the first surface 42 to the second surface 44, but the configuration is not limited thereto.

A width of the plastic bracket 40 in a Y-axis direction parallel to the metal back cover 20 is about 5 mm, which effectively reduces an antenna space. In addition, the antenna circuit board 50 is located next to the separated portion 34 and located below the plastic bracket 40.

The first radiator 110 includes a first section 111 (positions C1-C3), a second section 114, and a third section 115. The first section 111 includes a third terminal 112 (position C1) and a fourth terminal 113 (position C3) opposite to each other. The third terminal 112 is connected to the separated portion 34 near the first terminal 35. The second section 114 extends from the first section 111 between the third terminal 112 and the fourth terminal 113 and has a first ground terminal G1. The third section 115 extends from the fourth terminal 113 and has a second ground terminal G2.

The second radiator 120 (positions C6 to C7) extends from a portion of the separated portion 34 located between the feed terminal F and the second terminal 36 and has a third ground terminal G3.

The third radiator 130 is disposed between the first radiator 110 and the second radiator 120, and includes a fourth section 132 and a fifth section 134 (positions C4-C5) connected to each other. The fourth section 132 is located next to the third section 115 and has a fourth ground terminal G4, and the fifth section 134 extends from one end of the fourth section 132 opposite to the fourth ground terminal G4 toward a direction of the second radiator 120.

The fourth radiator 140 (positions B1-B2) is located between the first section 111 and the separated portion 34 and located between the fifth section 134 and the separated portion 34, and the fourth radiator 140 is connected to the separated portion 34.

The antenna module 100 further includes a first slot S1, and the first slot S1 is formed between the third section 115 and the fourth section 132. The antenna module 100 further includes a second slot S2, and the second slot S2 is formed between the first section 111 and the fourth radiator 140 and between the fifth section 134 and the fourth radiator 140. The first slot S1 and the second slot S2 together form a T-shaped gap.

In the embodiment, a coaxial transmission line 60 is welded to the bottom of the antenna circuit board 50, and there is a gap (not shown, for example, 1.6 mm) between the coaxial transmission line 60 and the metal back cover 20. A signal positive terminal of the coaxial transmission line 60 may be connected to a top surface of the antenna circuit board 50 through a through hole (not shown) of the antenna circuit board 50. As shown in FIGS. 2A, 2B and 2C, the antenna circuit board 50 extends to the separated portion 34, and connect an impedance matching circuit M1 and an elastic piece (not shown) in series to the feed terminal F of the separated portion 34.

The feed terminal F connects a path of the first radiator 110 from the positions C1, C2 to the first ground terminal G1 and a path of the first radiator 110 from the positions C1, C2, C3 to the second ground terminal G2 through a path of the positions A1, A3, and A4, and the feed terminal F connects a path of the second radiator 120 (positions C6, C7) to the third ground terminal G3 through a path of the positions Al and A2, and connects a ground terminal of the antenna circuit board 50 and a system ground plane of the metal back cover 20 to form an inverted F-shaped antenna structure.

In the embodiment, the separated portion 34, the first radiator 110, and the second radiator 120 jointly excite a low frequency band, a medium-high frequency band, and an ultra-high frequency band. The low frequency band is between 600 MHz and 960 MHz, the medium-high frequency band is between 1700 MHz and 2000 MHz, and the ultra-high frequency band is between 4900 MHz and 6000 MHz.

As shown in FIG. 2A, a length of the separated portion 34 (a sum of lengths L1 and L2 in FIG. 2A) is 0.25 times the wavelength of the low frequency band (800 MHz). The length L1 is, for example, 78 mm, and the length L2 is, for example, 14 mm. In addition, a distance L3 between the separated portion 34 and the connecting portion 32 is, for example, 2 mm. A distance LA between the feed terminal F and a short side of the separated portion 34 is, for example, 14.5 mm.

In addition, the first radiator 110, the third radiator 130, and the fourth radiator 140 jointly excite a high frequency band. The high frequency band is between 2000 MHz and 4900 MHz.

In the embodiment, the electronic device 10 may be used to adjust resonant frequency point positions and impedance matching bandwidths of the low frequency band, the medium-high frequency band, and the ultra-high frequency band by adjusting a position of the feed terminal F relative to the path of the positions A1 and A2. The electronic device 10 may be used to adjust the impedance matching bandwidth of the ultra-high frequency band by adjusting a distance between the path from the position C2 to the first ground terminal G1 and a path from the position C3 to the second ground terminal G2.

In addition, the electronic device 10 may adjust the impedance matching of the medium-high frequency band/ultra-high frequency band (2000 MHz-4900 MHz) through the first slot S1 and the second slot S2. The electronic device 10 may be used to adjust the resonant frequency point position and impedance matching of the ultra-high frequency band (3300 MHz-4600 MHz) by adjusting a length and a width of a path from the positions C5 and C4 of the third radiator 130 to the fourth ground terminal G4. The electronic device 10 may adjust impedance matching of the high frequency band/ultra-high frequency band (2000 MHz-4900 MHz) by adjusting a length and a width of the fourth radiator 140 (positions B1 and B2) and a spacing between the first slot S1 and the second slot S2.

In addition, in the embodiment, the antenna module 100 includes a switching circuit M2, and the switching circuit M2 is connected to the third ground terminal G3 of the second radiator 120. Specifically, the path of the positions C6 and C7 of the second radiator 120 may be connected to the third ground terminal G3, and then connected to the antenna circuit board 50 through the switching circuit M2.

The switching circuit M2 switches between an open circuit and a passive component (not shown), where the passive component is provided at the third ground terminal G3 of the second radiator 120. In the embodiment, the passive component is, for example, an inductor of 18 nH, but the type of the passive component is not limited thereto.

When the switching circuit M2 is switched to the open circuit (i.e., without adding any RLC component), the low frequency may resonate in the frequency band of 600 MHz-720 MHz. When the switching circuit M2 is switched to be connected in series with the inductor of 18 nH, the low frequency may resonate in the frequency band of 720 MHz-960 MHz. Therefore, when the switching circuit M2 switches between the open circuit and the series connection with the inductor of 18 nH, the antenna module 100 may cover a low frequency bandwidth of 600 MHz to 960 MHz, thereby achieving a low frequency broadband effect. In addition, after testing, the resonant frequency bands of medium-high frequency and ultra-high frequency are not easily affected by the switching of the switching circuit M2.

In addition, the electronic device 10 further includes a conductor retaining wall 70, and the conductor retaining wall 70 is used to joint the metal back cover 20 and a metal area on the back of a screen (not shown) in a Z-axis direction vertical to the metal back cover 20. The conductor retaining wall 70 is, for example, conductive foam, but the type of the conductor retaining wall 70 is not limited thereto.

The first radiator 110, the second radiator 120, the third radiator 130, and the fourth radiator 140 are located between the conductor retaining wall 70 and the separated portion 34, and a distance L5 (FIG. 2A) between the separated portion 34 and the conductor retaining wall 70 is 0.05 times the wavelength of the low frequency band. Specifically, the distance L5 (FIG. 2A) between the separated portion 34 and the conductor retaining wall 70 is approximately 0.042 times the wavelength of 800 MHz, which is 15 mm to 16 mm.

Figure 4:
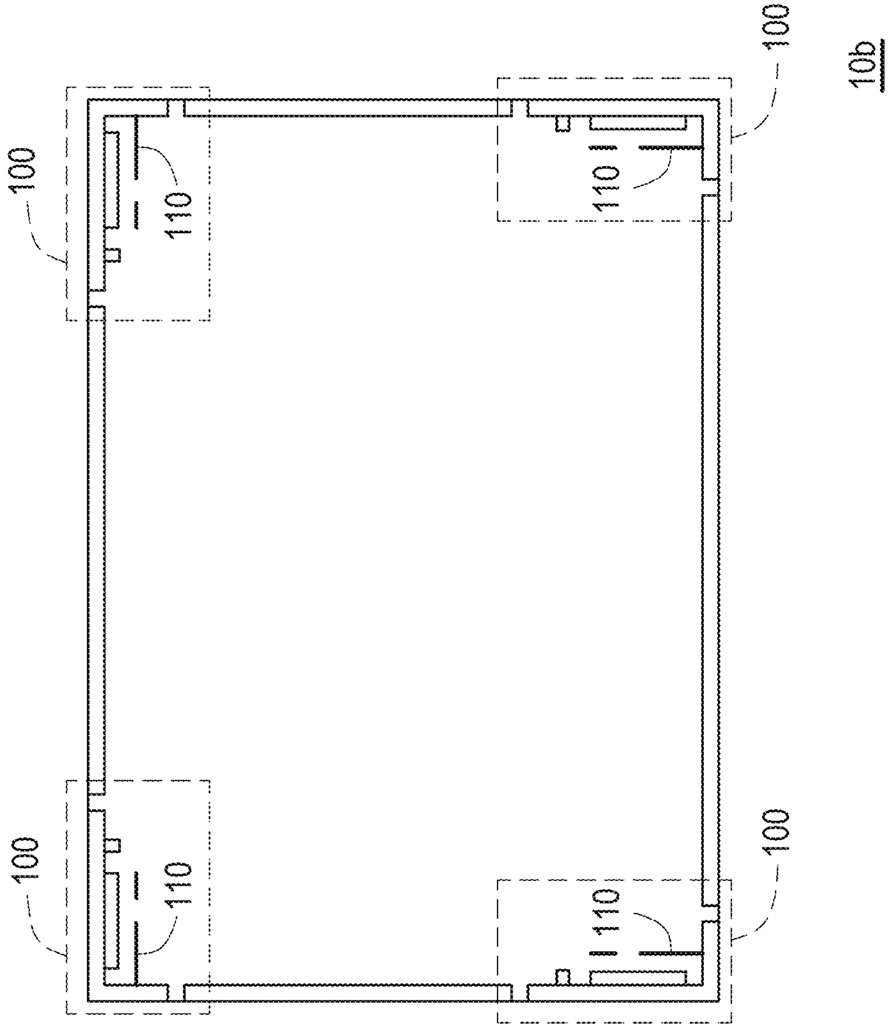
FIG. 3 and FIG. 4 are schematic top views of various electronic devices according to other embodiments of the invention.
Figure 3:
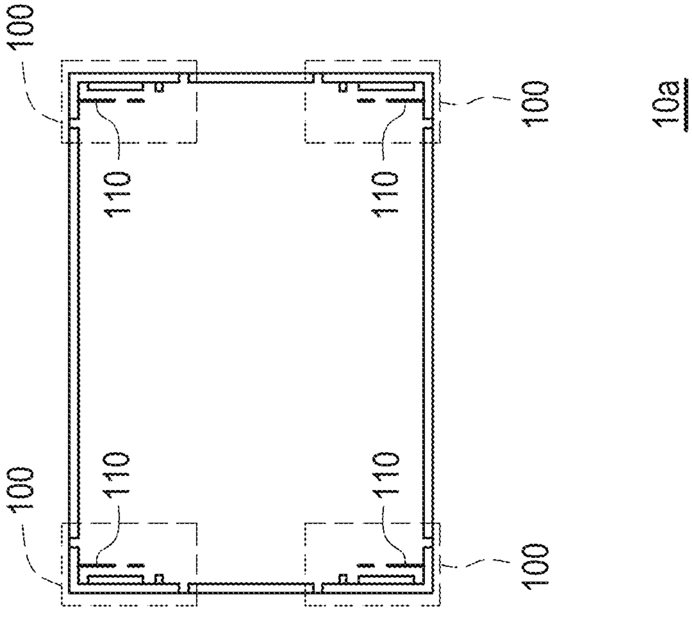

FIG. 3 and FIG. 4 are schematic top views of various electronic devices according to other embodiments of the invention. Referring to FIG. 3 first, an electronic device 10*a* includes a plurality of antenna modules 100, and these antenna modules 100 are respectively disposed at a plurality of corners of the electronic device 10*a*. In the embodiment, there are, for example, four antenna modules 100, which are arranged at four corners of the electronic device 10*a*.

In the embodiment of FIG. 3, a diagonal length of the electronic device 10*a* is less than 9 inches. The first radiator 110 of each of the antenna modules 100 is located next to one of the short sides of the electronic device 10*a* and extends along the short side.

Referring to FIG. 4, in the embodiment of FIG. 4, a diagonal length of an electronic device 10*b* is greater than or equal to 9 inches. The first radiator 110 of the antenna module 100 in the lower left corner and the first radiator 110 of the antenna module 100 in the lower right corner are located next to the two short sides of the electronic device 10*b* and extend along the two short sides. The first radiator 110 of the antenna module 100 in the upper left corner and the first radiator 110 of the antenna module 100 in the upper right corner are located next to the two long sides of the electronic device 10*b* and extend along the two long sides.

Figure 5:
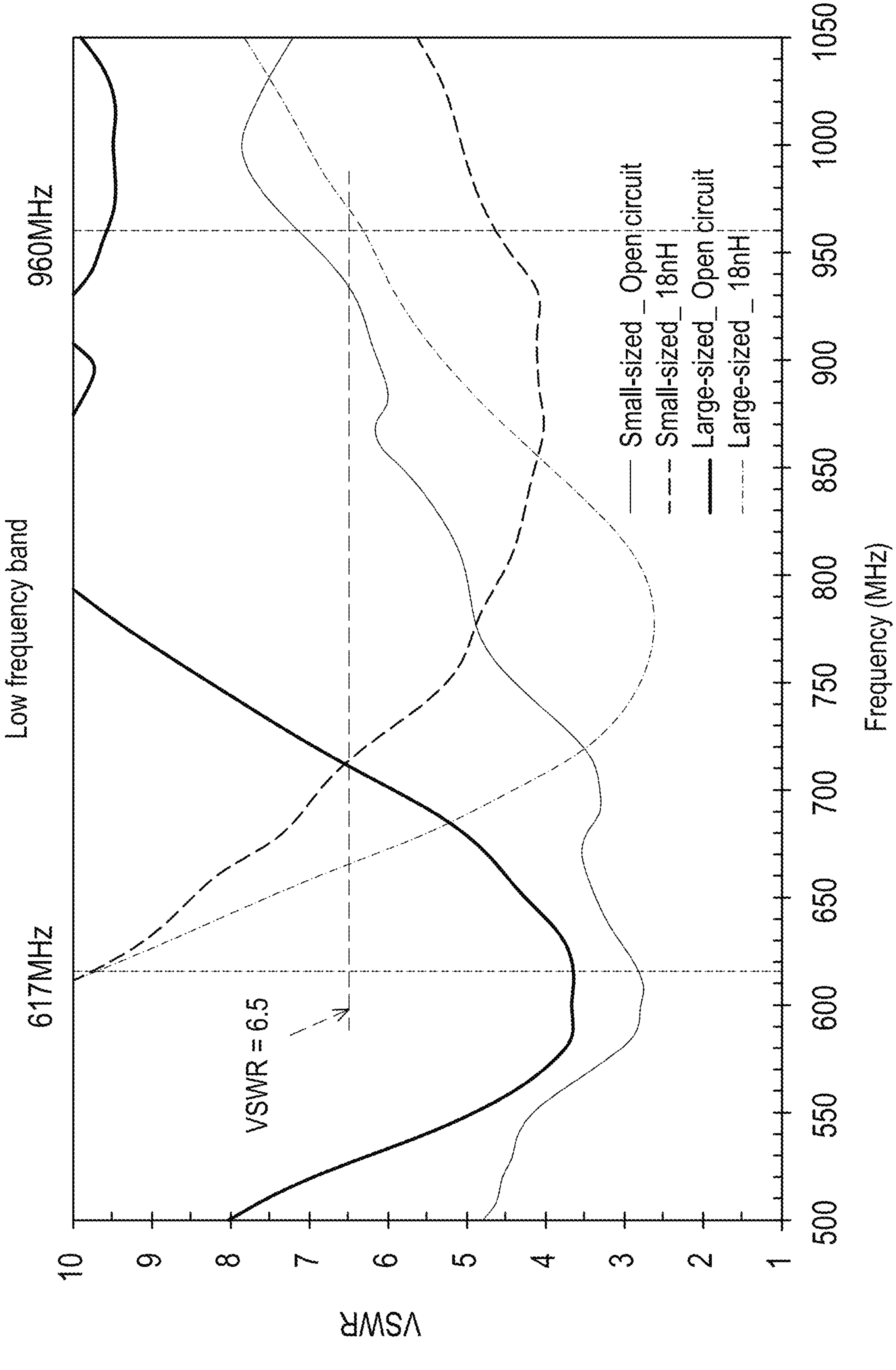
FIG. 5 is a low frequency band-VSWR relationship diagram when the antenna module of FIG. 1 is configured in electronic devices of different sizes.

FIG. 5 is a low frequency band-VSWR relationship diagram when the antenna module of FIG. 1 is configured in electronic devices of different sizes. Referring to FIG. 5, in the embodiment, regardless of a small-sized (less than 9 inches) or large-sized (greater than or equal to 9 inches) electronic device, the antenna module 100 may cover impedance matching bandwidth of 617-960 MHz by switching the switching circuit M2, and the VSWR performance may be below 6.5.

Figure 6:
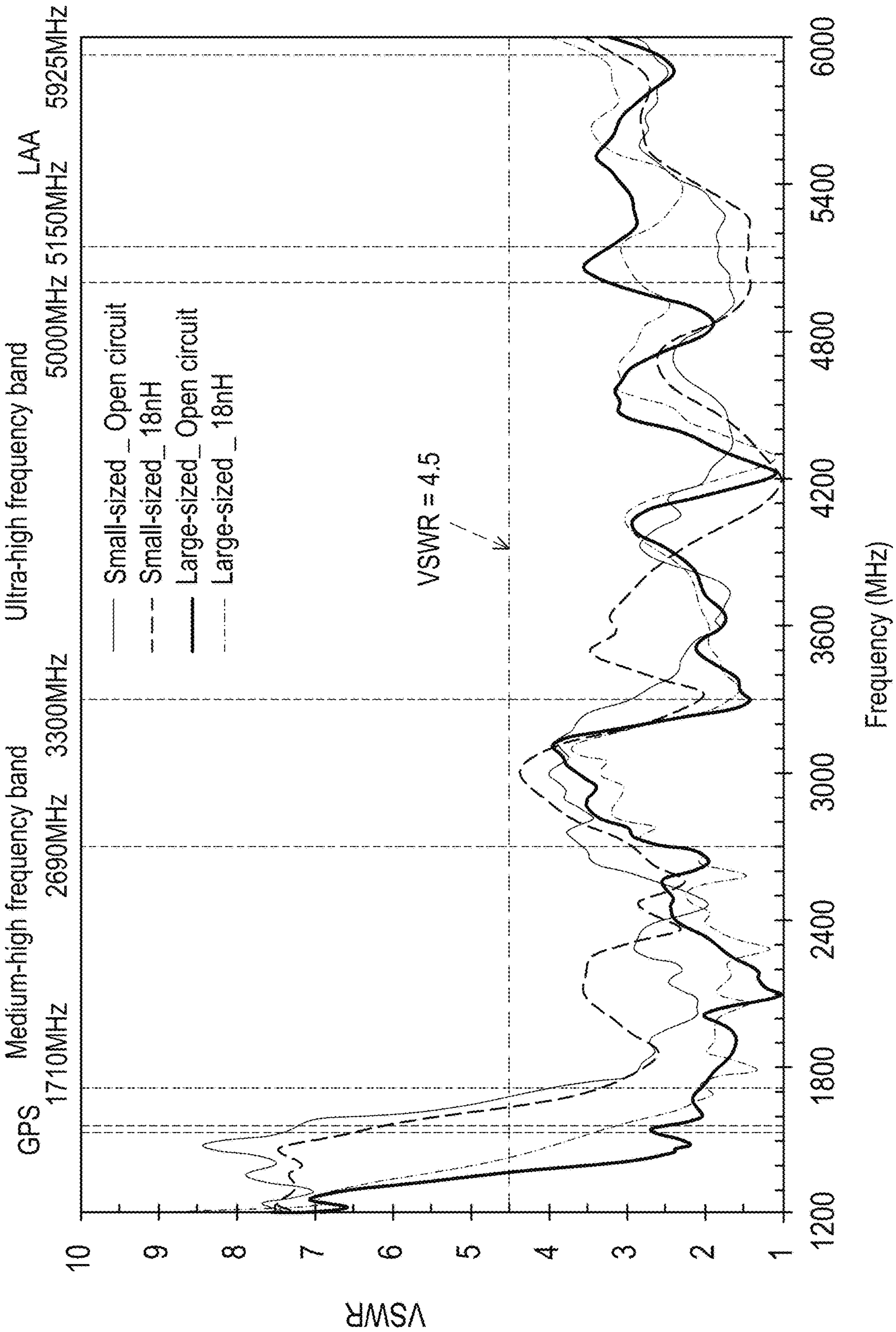
FIG. 6 is a high frequency band-VSWR relationship diagram when the antenna module of FIG. 1 is configured in electronic devices of different sizes.

FIG. 6 is a high frequency band-VSWR relationship diagram when the antenna module of FIG. 1 is configured in electronic devices of different sizes. Referring to FIG. 6, regardless of the small-sized (less than 9 inches) or large-sized (greater than or equal to 9 inches) electronic device, the antenna module 100 may cover the medium-high frequency band of 1710-2690 MHz and the ultra-high frequency band n77-n79 of 3300-5000 MHz. When the antenna module 100 switches the low frequency through the switching circuit M2, the VSWR performance of the medium-high frequency band of 1710-2690 MHz and the ultra-high frequency band n77-n79 of 3300-5000 MHz may all be below 4.5. Therefore, the antenna module 100 may have broadband and multi-band effects.

Figure 7:
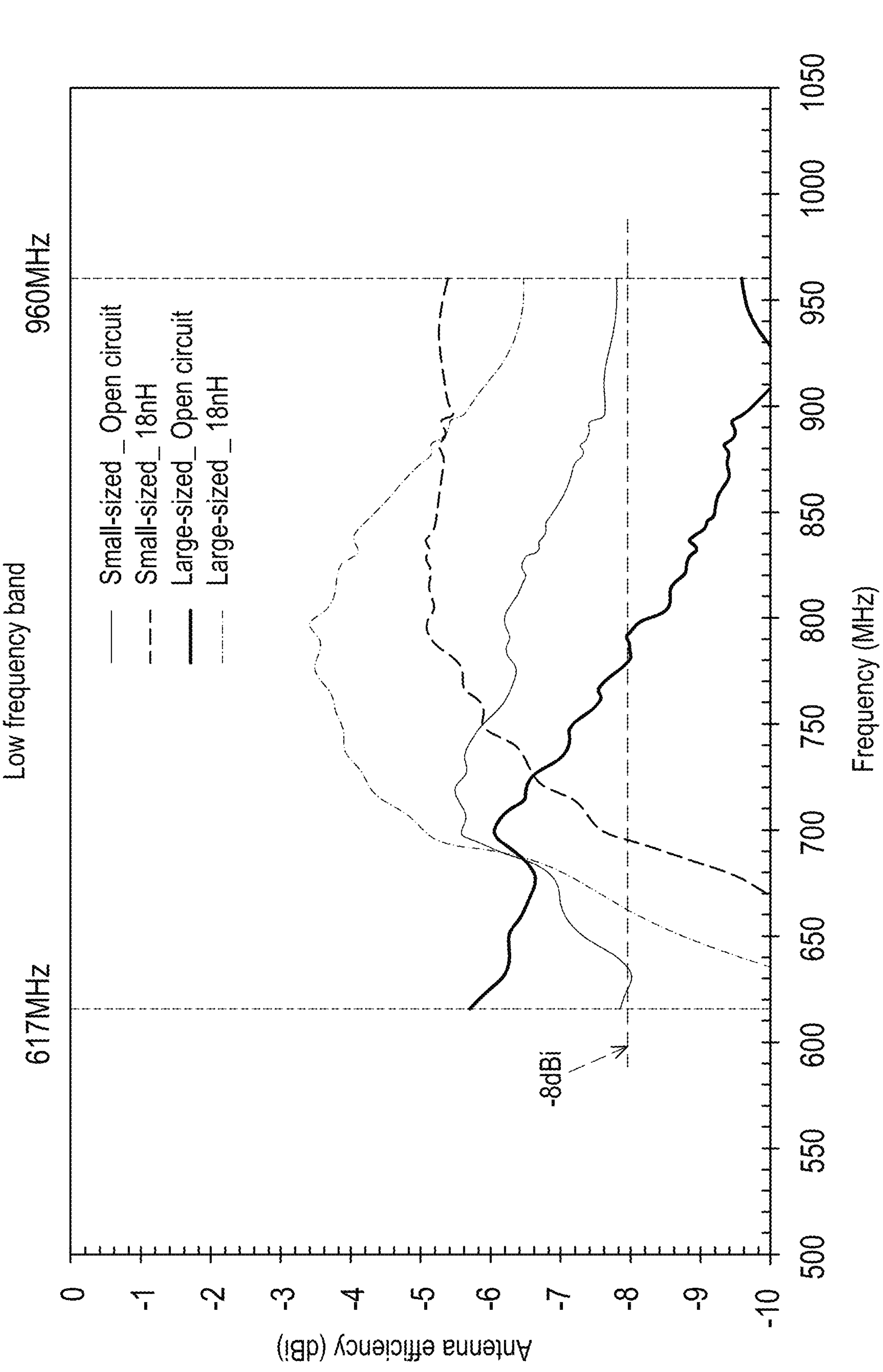
FIG. 7 is a low frequency band-antenna efficiency relationship diagram when the antenna module of FIG. 1 is configured in electronic devices of different sizes.
Figure 8:
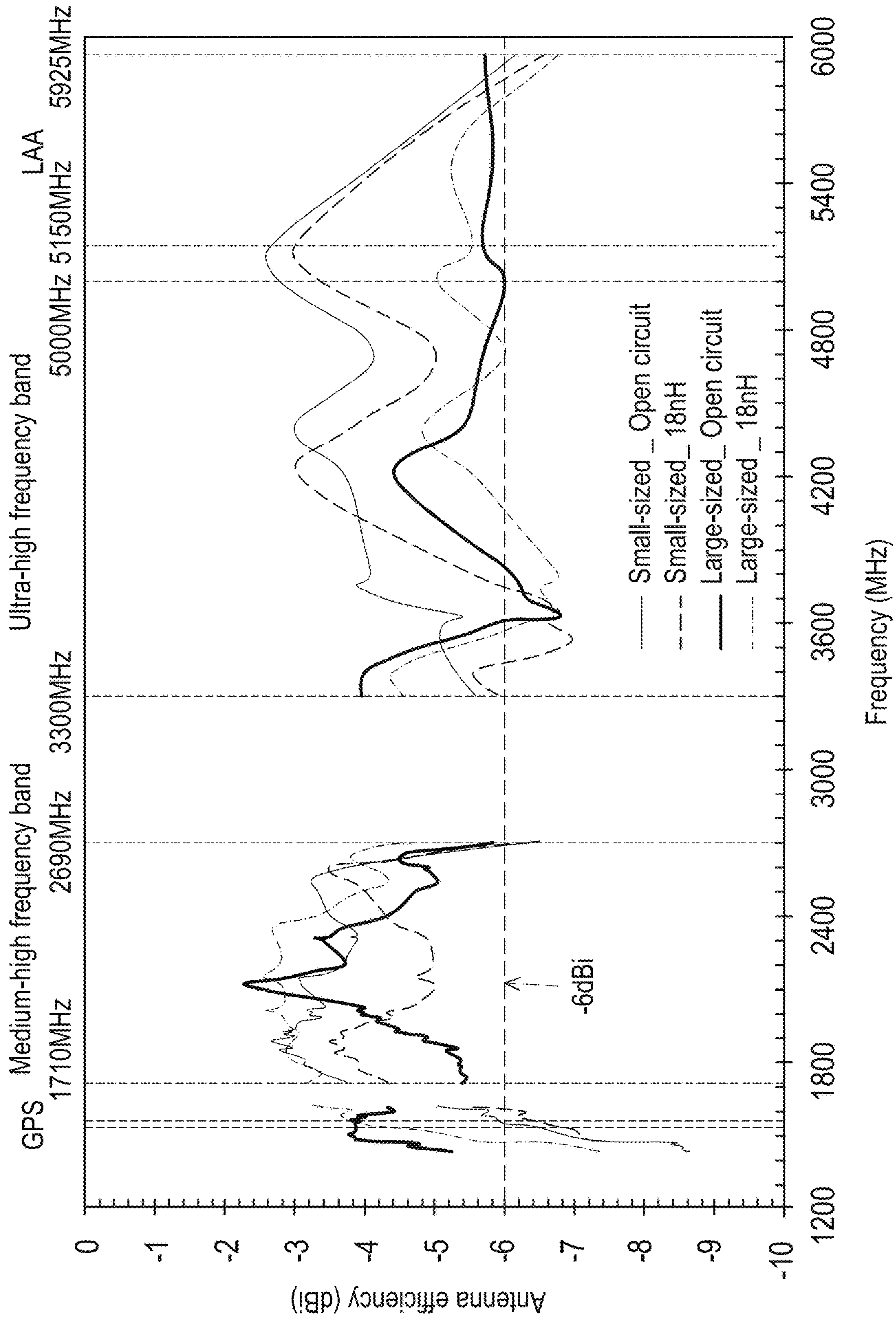
FIG. 8 is a high frequency band-antenna efficiency relationship diagram when the antenna module of FIG. 1 is configured in electronic devices of different sizes.

FIG. 7 is a low frequency band-antenna efficiency relationship diagram when the antenna module of FIG. 1 is configured in electronic devices of different sizes. FIG. 8 is a high frequency band-antenna efficiency relationship diagram when the antenna module of FIG. 1 is configured in electronic devices of different sizes. Referring to FIG. 7 and FIG. 8, regardless of the small-sized (less than 9 inches) or large-sized (greater than or equal to 9 inches) electronic device, as shown in FIG. 7, the antenna efficiency of the antenna module 100 in the low frequency band of 617-960 MHz is −3.4 to −8.0 dBi. As shown in FIG. 8, the antenna efficiency of the antenna module 100 in the GPS frequency band of 1565-1610 MHz is −3.3 to −6.4 dBi, the antenna efficiency of the antenna module 100 in the medium-high frequency band of 1710-2690 MHz is −2.3 to −6.4 dBi, the antenna efficiency of the antenna module 100 in the ultra-high frequency band of 3300-5000 MHz is −2.8 to −6.9 dBi, and the antenna efficiency of the antenna module 100 in the LAA frequency band of 5150-5925 MHz is −2.7 to −6.8 dBi, which achieves characteristics of a full frequency band antenna.

In summary, the separated portion of the electronic device of the invention serves as a part of the antenna module, the first section of the first radiator is connected to the separated portion, the second section of the first radiator extends from the first section to the first ground terminal, and the third section of the first radiator extends from the first section to the second ground terminal. The second radiator extends from the separated portion to the third ground terminal. The fourth section of the third radiator is located next to the third section and extends to the fourth ground terminal, and the fifth section of the third radiator extends from the fourth section to the second radiator. The fourth radiator is connected to the separated portion. Through the above-mentioned special antenna design, the electronic device of the invention is adapted to provide a good antenna function when the casing is mainly made of a metal material.

What is claimed is:

1. An electronic device, comprising:

a metal back cover;

a metal frame, comprising at least two connecting portions, wherein the at least two connecting portions are connected to the metal back cover;

at least one antenna module, each of the antenna modules comprising:

a separated portion, spaced between the at least two connecting portions, wherein the separated portion is separated from the metal back cover, and comprises a feed terminal, a first terminal, and a second terminal, the first terminal and the second terminal are away from each other, and the feed terminal is located between the first terminal and the second terminal;

a first radiator, comprising a first section, a second section, and a third section, wherein the first section comprises a third terminal and a fourth terminal opposite to each other, the third terminal is connected to the separated portion near the first terminal, the second section extends from a portion of the first section located between the third terminal and the fourth terminal and has a first ground terminal, and the third section extends from the fourth terminal and has a second ground terminal;

a second radiator, extending from a portion of the separated portion located between the feed terminal and the second terminal and has a third ground terminal a third radiator, disposed between the first radiator and the second radiator, and comprising a fourth section and a fifth section connected to each other, wherein the fourth section is located next to the third section and the fourth section has a fourth ground terminal, and the fifth section extends from one end of the fourth section opposite to the fourth ground terminal toward a direction of the second radiator; and a fourth radiator, located between the first section and the separated portion and between the fifth section and the separated portion, wherein the fourth radiator is connected to the separated portion.

2. The electronic device as claimed in claim 1, wherein the at least one antenna module further comprises a first slot, and the first slot is formed between the third section and the fourth section.

3. The electronic device as claimed in claim 1, wherein the at least one antenna module further comprises a second slot, and the second slot is formed between the first section and the fourth radiator and between the fifth section and the fourth radiator.

4. The electronic device as claimed in claim 1, wherein the separated portion, the first radiator, and the second radiator jointly excite a low frequency band, a medium-high frequency band, and an ultra-high frequency band.

5. The electronic device as claimed in claim 4, wherein the low frequency band is between 600 MHz and 960 MHz, the medium-high frequency band is between 1700 MHz and 2000 MHz, and the ultra-high frequency band is between 4900 MHz and 6000 MHz.

6. The electronic device as claimed in claim 4, wherein a length of the separated portion is 0.25 times a wavelength of the low frequency band.

7. The electronic device as claimed in claim 4, further comprising a conductor retaining wall, wherein the first radiator, the second radiator, the third radiator, and the fourth radiator are located between the conductor retaining wall and the separated portion, and a distance between the separated portion and the conductor retaining wall is 0.05 times a wavelength of the low frequency band.

8. The electronic device as claimed in claim 1, wherein the first radiator, the third radiator, and the fourth radiator jointly excite a high frequency band.

9. The electronic device as claimed in claim 8, wherein the high frequency band is between 2000 MHz and 4900 MHz.

10. The electronic device as claimed in claim 1, wherein each of the antenna modules comprises an impedance matching circuit electrically connected to the feed terminal.

11. The electronic device as claimed in claim 1, wherein each of the antenna modules further comprises a switching circuit connected to the third ground terminal of the second radiator.

12. The electronic device as claimed in claim 11, wherein the switching circuit switches between an open circuit and a passive component, and the passive component is disposed at the third ground terminal of the second radiator.

13. The electronic device as claimed in claim 1, wherein a number of the at least one antenna module is plural, and the antenna modules are respectively disposed at a plurality of corners of the electronic device.

14. The electronic device as claimed in claim 13, wherein a diagonal length of the electronic device is less than 9 inches, the electronic device further comprises two short sides, and the first radiator of each of the antenna modules is located next to one of the two short sides of the electronic device and extends along the short side of the electronic device.

15. The electronic device as claimed in claim 13, wherein a diagonal length of the electronic device is greater than or equal to 9 inches, the electronic device further comprises two long sides and two short sides, the first radiator of one of the antenna modules is located next to one of the two short sides of the electronic device and extends along the short side of the electronic device, and the first radiator of another one of the antenna modules is located next to one of the two long sides of the electronic device and extends along the long side of the electronic device.

16. The electronic device as claimed in claim 1, further comprising a plastic bracket and an antenna circuit board, wherein the plastic bracket comprises a first surface, a second surface, a third surface, and a fourth surface, the first surface and the third surface are perpendicular to the second surface and the fourth surface, the fourth surface and the third surface are respectively connected to the separated portion and the antenna circuit board, the first radiator and the third radiator are disposed on the second surface, the fourth radiator is disposed on the first surface, and the second radiator extends from the first surface to the second surface.

17. The electronic device as claimed in claim 1, wherein the separated portion is L-shaped and is disposed at a corner of the electronic device.

* * * * *